United States Patent [19]

Ruthart et al.

[11] 4,098,916

[45] Jul. 4, 1978

[54] PROCESS OF DISPENSING, MEASURING, COATING AND CUTTING SHEET MATERIAL

[76] Inventors: Leonard Crawford Ruthart, 408 Taylor La.; Virgil Lynn Williams, 2611 Tenth Ave., both of Canyon, Tex. 79015

[21] Appl. No.: 816,153

[22] Filed: Jul. 15, 1977

Related U.S. Application Data

[60] Continuation of Ser. No. 617,748, Sep. 29, 1975, abandoned, which is a division of Ser. No. 396,059, Sep. 10, 1973, Pat. No. 3,924,561.

[51] Int. Cl.[2] .............................................. C09J 7/04

[52] U.S. Cl. ........................................ 427/8; 427/179; 427/207 R; 427/289; 427/428

[58] Field of Search ............... 427/8, 289, 179, 207 R, 427/428

[56] References Cited

U.S. PATENT DOCUMENTS

| | | | |
|---|---|---|---|
| 2,373,644 | 4/1945 | Belch | 118/9 |
| 3,916,039 | 10/1975 | Akashi et al. | 427/128 |

*Primary Examiner*—Bernard D. Pianalto

*Attorney, Agent, or Firm*—Ely Silverman

[57] ABSTRACT

Rolls of vinyl wall paper and the like are concurrently automatically dispensed and accurately metered and coated preparatory to being accurately cut to length while providing for rapid and uniform metering of such material without wrinkling thereof. The process provides substantial improvements in productivity and material utilization.

8 Claims, 15 Drawing Figures

FIG. 8
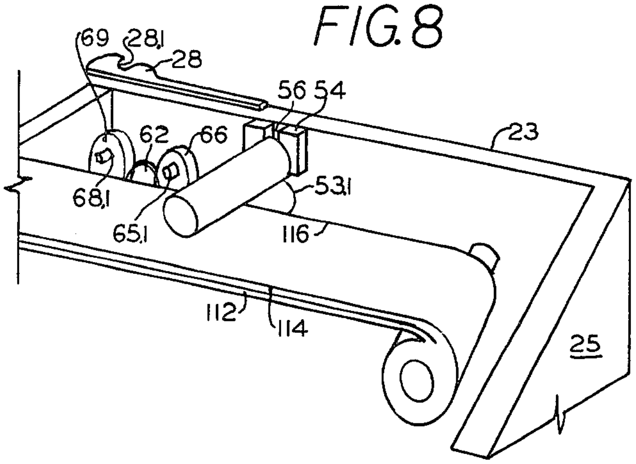
FIG. 9
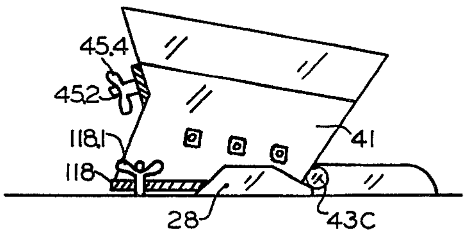
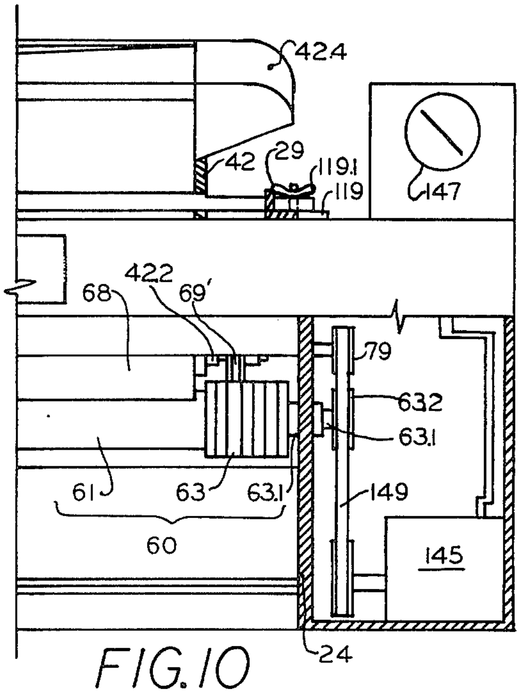
FIG. 10
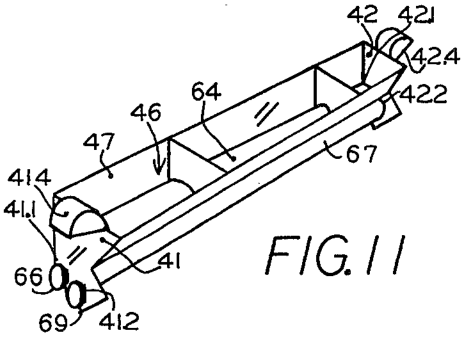
FIG. 11
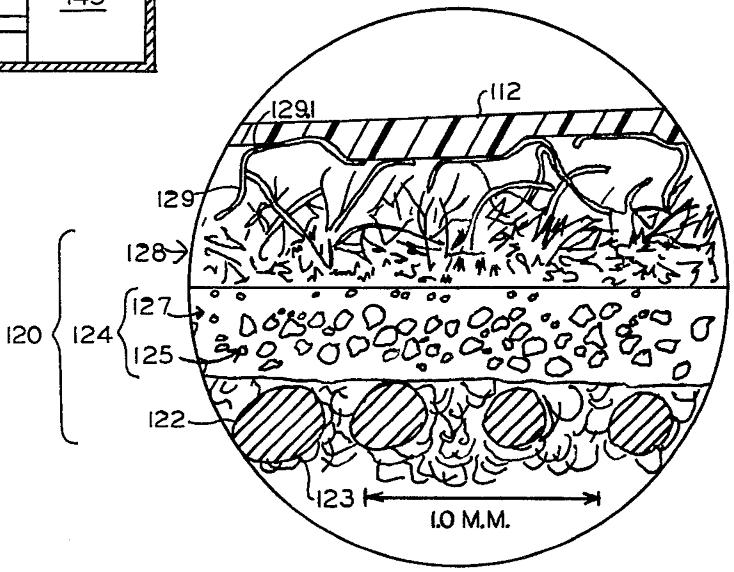
FIG. 12

PROCESS OF DISPENSING, MEASURING, COATING AND CUTTING SHEET MATERIAL

CROSS REFERENCE TO RELATED APPLICATIONS

This is a continuation of application Ser. No. 617,748 filed Sept. 29, 1975 and now abandoned, which application is a division of our co-pending application Ser. No. 396,059 filed Sept. 10, 1973, issued Dec. 9, 1975, as U.S. Pat. No. 3,924,561.

BACKGROUND OF THE INVENTION

1. THE FIELD OF THE INVENTION

The fields of art to which this invention pertains are fabric reeling and unreeling, dispensers and reel drives, registers and rotation devices.

2. DESCRIPTION OF THE PRIOR ART

The prior art of dispensing, cutting, treating and applying wallpaper utilized support for rolls of 24 inch to 54 inch width and 30 to 50 yard length to dispense therefrom lengths of wallpaper — which were then cut by hand on flat tables with some excess length allowed for irregular cutting or pulling. The cut lengths were stacked in groups of about 10 such cut lengths; thereafter, the separate lengths were removed from the stack one at a time and adhesive applied to each of such lengths individually on a gluing table; thereafter, each of such coated lengths was removed from the table on which glued and applied to the wall to which to be attached. In the trade, it usually required four men a day to so dispense, cut, treat and apply 120 yards of vinyl wallpaper.

SUMMARY OF THE INVENTION

A roll of vinyl wallpaper is passed between a pair of counter rollers including a first straight powered, rotatably mounted rigid bottom roller with a middle thin layer of resilient material and a coating of very fine resilient hard fibers exterior thereto extending separately at an angle to such resilient coat in varying lengths and a second straight rotatable rigid upper roller that is located above the first roller. Of the large number — about 50,000 per square inch — of such thin fibers, about 0.025 mm diameter and 0.25 to 2.5 mm long and readily bendable, only a small fraction locks against the vinyl surface but are sufficient in number to limit any one portion of the vinyl surface from passing through the space between the two rollers at a greater speed than other portions of the vinyl surface.

In this operation of contacting the wallpaper by the two rollers, the longer fibers (as 129 in FIG. 12) are bent downward by the weight applied thereagainst by the vertically movable heavy upper roll through the vinyl sheet and provide a very great intensity of force or pressure at the very small areas of contact of such fiber and vinyl surface. These areas of contact are linear rather than pointed so that puncture of the vinyl surface is avoided.

As all portions of the vinyl are moved at the same rate of speed, the top roller located above the first roller and resting on the backing of the vinyl is rotated by the friction between the backing layer of the wallpaper and the peripheral rough cylindrical surface of the upper roller at the same linear speed as the vinyl sheet moves.

A pivotally mounted counter wheel sensitive to the linear motion of the upper roller provides an undistorted measure of the rate of movement of the vinyl cloth past the lower roll notwithstanding variations in thickness of the vinyl sheet due to embossing.

The holding power of the counter rolls when those rolls are stationary also serves to hold the sheet against displacement after glue is applied to the vinyl sheet and when the thus coated sheet is being cut.

The result of this process is that three men normally dispense, meter, coat, cut and apply 240 yards of wallpaper per day by the apparatus and process of this invention.

BRIEF DESCRIPTION OF THE DRAWINGS

FIG. 8 is an internal oblique view of zone 8A—8A of FIG. 3 with all of adhesive dispenser assembly 40 removed except drive rollers 66 and 69.

FIG. 9 is a side view in direction of arrow 9A of FIG. 5 of portion 9B of FIG. 2.

FIG. 10 is a front view of zone 10A of FIG. 2 partly broken away.

FIG. 11 is a side and top and front oblique view of adhesive dispenser assembly 40 separate from the remainder of apparatus 20.

FIG. 12 is a much enlarged view of zone 12A of FIG. 6 to show details of structure of the power counter roller 71 peripheral layer 120 and the size thereof.

DESCRIPTION OF THE PREFERRED EMBODIMENT

Figure 1:
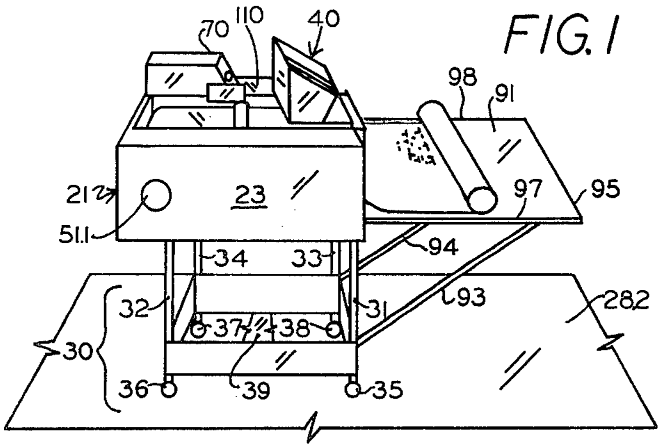
FIG. 1 is a side view of the apparatus 20 taken along the arrow 1A of FIG. 2.
Figure 2:
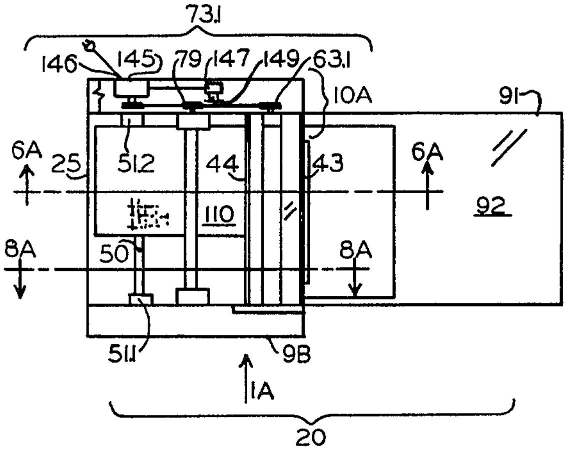
FIG. 2 is a top view of apparatus 20 partly broken away.

The exemplary apparatus 20 shown in the figures of the drawing referred to in this specification comprises a main frame assembly 21, a liquid adhesive dispenser assembly 40, a counter and drive assembly 70 and a cutting board assembly 91, in operative combination. The main frame assembly is supported on a base assembly 30 over the floor 28.2. The liquid dispenser assembly 40 is removably yet firmly and accurately located on the main frame assembly 21 and the counter assembly 70 is firmly yet sensitively attached to the main frame assembly and is actuated by operations occuring at the cutting board assembly. The main frame assembly 21 comprises a rigid vertical left side frame member 23, a rigid vertical right side frame member 24, a rigid vertical rear transverse frame member 25 and a front transverse frame member 26 and supports rollers and other portions of the counter assembly 70 and of the adhesive dispenser assembly 40 as well as assembly 91.

Left side member 23 is firmly joined at its front and rear to members 25 and 26, respectively, and the right side member is firmly joined at its front end to the front and rear members 25 and 26, respectively, in a dimensionally stable and angularly fixed rigid frame open at its top and bottom. These members 23–26 are rigid, vertical members made of solid wood about one inch thick and 9 inches high in the exemplary embodiment. A floor member 27 may be joined to the bottom and assist in holding the members 23–26 in place.

A notched bracket 28 is firmly located on top of left side member 23 and a notched bracket 29 is located on top of right side member 24 for location of and support of the dispensing assembly 40 on the main frame assembly 21.

Figure 13:
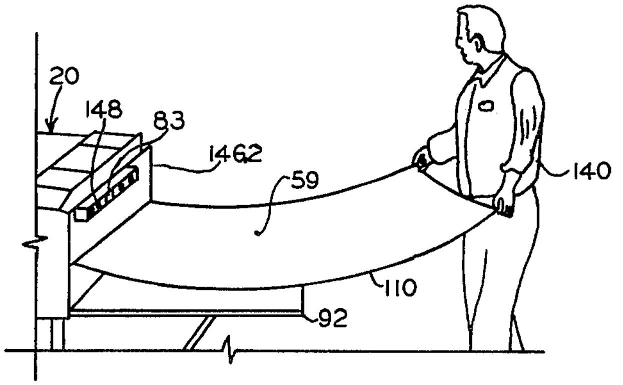
FIGS. 13, 14 and 15 are diagrammatic views of the use of the apparatus 20 and its product.
Figure 14:
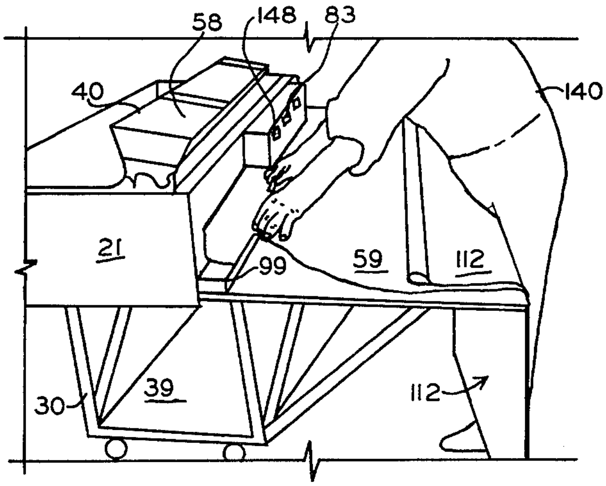
Figure 15:
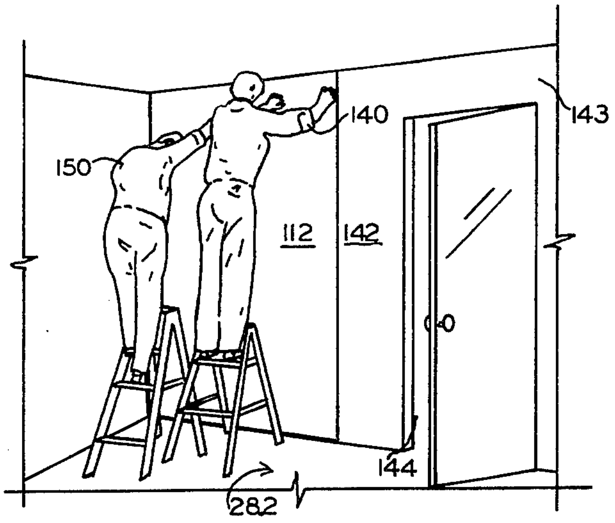

A rigid base assembly 30 comprises rigid vertically extending leg members firmly attached to the floor of the main frame assembly 21. These legs are left front leg member 31, left rear leg 32, right front leg 33 and right rear leg 34, each with a foot 35, 36, 38 and 37, respectively and attached to a lower shelf 39. The assembly 30 is firmly joined to the floor 27 of frame assembly so that the cutting board 92 will be at a convenient height for the operator 140 as shown in FIGS. 13–14.

The adhesive dispensing assembly 40 comprises a frame 49 and rollers, adhesive dispensing rollers 64 and 67, and power roller 60. The adhesive dispensing assembly frame comprises a rigid trapezoidal flat left side plate wall member 41, a rigid right trapezoidal flat side plate wall member 42, a rigid rectangular flat front sloped plate wall member 43 and a rear sloped rectangular flat wall frame member 44 that are rigidly joined together to form a rigid adhesive dispensing assembly frame. The vertical arm of each of L-shaped brackets 118 and 119 are firmly attached to outer wall surface of wall members 41 and 42, respectively, and an anchor brace 43B is firmly attached to front of wall member 43. The horizontally extending arms of the brackets 118 and 119 extend laterally from walls 41 and 42, respectively near their bottoms and are rigid and releasably yet firmly engage the brackets 28 and 29 on top of walls 23 and 24, respectively. Walls 41, 42, 43 and 44 are imperforate.

The frame 49 rotatably supports adhesive dispensing rollers 64 and 67 and rests on and is held by brackets 28 and 29; a movable gate 45 is a rigid imperforate plate that is firmly yet adjustably supported on the rear wall member 44 for sliding vertical adjusting movement therealong. Bolts 45.1 and 45.2 are firmly attached to the outer surface of wall 44 and passes through vertically extending narrow slots as 44.1 (and 44.2), respectively, to engage wing nuts as 45.3 and 45.4, respectively. The walls 41–44 and gate 45 define an adhesive dispensing compartment 46 open at its top 47 and with a bottom opening 48, top opening 47 being longer from front to rear than the bottom opening 48.

Adhesive dispensing rollers 64 and 67 are firmly yet rotatably held in side walls 41 and 42 in spaced relation to contact each other. The rear adhesive roller 64 comprises a central portion 65 and left lateral drive rollers 66 and right lateral drive roller 66'. The center portion 65 comprises a rigid cylindrical steel shaft 65.1 and a peripheral cylindrical tufted adhesive dispensing portion 65.2 of gross or generally uniform overall diameter and length attached thereto. The shaft 65.1 extends through rear roller bearings 41.1 and 42.1 in walls 41 and 42, respectively and is located in and below the bottom opening 48 of compartment 46 and is firmly attached to rollers 66 and 66' laterally of walls 41 and 42, respectively. Rollers 66 and 66' are of the same size and are made of hard rubber and operatively engage the drive rollers 62 and 63, respectively of power roller 60.

The front adhesive roller 67 comprises a central portion 68, and a left lateral drive roller 69 and a right lateral drive roller 69'. The center portion 68 comprises a rigid cylindrical steel shaft 68.1 and a peripheral cylindrical tufted adhesive dispensing portion 68.2 of gross or generally overall uniform peripheral external diameter wrapped therearound as single layer and firmly attached thereto and extending from the central or inner surface of one wall 41 of assembly 40 to the inner or central surface of the opposite wall 42 of assembly 40, as also does portion 65.2 of roller 64. The shaft 68.1 extends through front roller bearings 41.2 and 42.2 in walls 41 and 42, respectively, and is attached to rollers 69 and 69' laterally of walls 41 and 42, respectively. Rollers 69 and 69' are of the same size and are made of hard rubber and operatively engage the drive rollers 62 and 63, respectively, of power roller 60.

Figure 6:
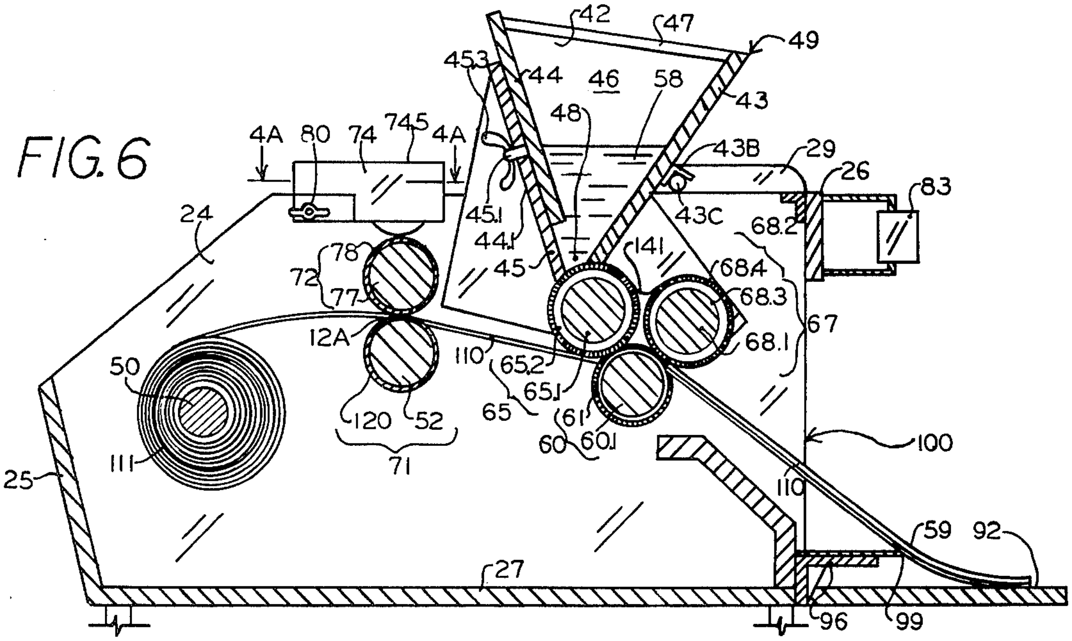
FIG. 6 is a vertical transverse sectional view along section 6A—6A of FIG. 2.
Figure 7:
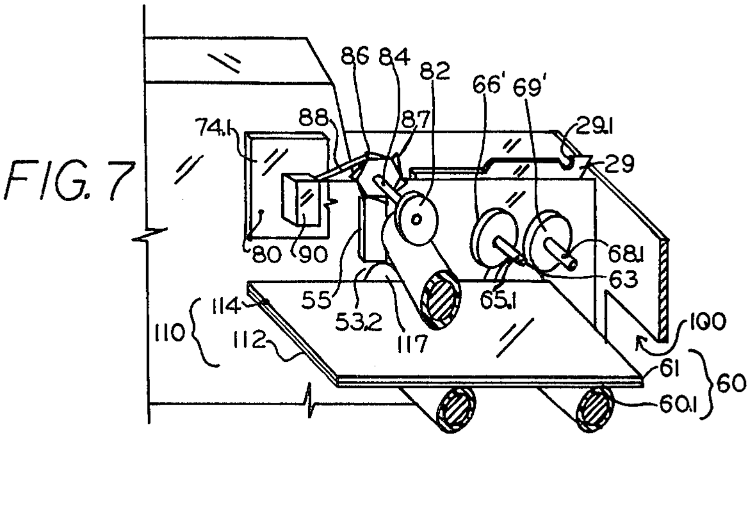
FIG. 7 is an internal oblique diagrammatical view of zone 7A of FIG. 3 in operative position of the parts shown in FIG. 3, with all of adhesive dispenser assembly 40 removed except drive rollers 66′ and 69′.

The bearings 41.1, 41.2, 42.1 and 42.2 are located so that the tufted portions 65.2 and 68.2 are in light even contact with each other along their entire length and also in resilient contact with the front edge of the central portion of central portion 61 of roller 60, as shown in FIG. 6. The lateral rollers 66 and 66' and 69 and 69' rest on the lateral portions 62 and 63 of drive roller 60 and are driven thereby to rotate about their central longitudinal axis. The central longitudinal axes of rollers 50, 60, 64, 67, 71, 72 and their shafts, as 60.1, are parallel to each other and to rear wall member 25 and cutter edge 99 and transverse to frame side members 23 and 24.

A rigid transversely extending rear feed roll support roller shaft 50 is firmly yet rotatably located in left and right feed roll journals 51.1 and 51.2. A counter bottom roll 71 is also firmly rotatably supported in fixed left and right bearings 53.1 and 53.2. Journals 51.1, 51.2, 53.1 and 53.2 are firmly located in the side frame members 23 and 24, respectively.

A cylindrical top counter roller 72 is located in left and right top counter roll brackets 54 and 55. Brackets 54 and 55 are firmly attached to side frame members 23 and 24, respectively. Top counter roller 72 is located with its central longitudinal cylindrical axis in a plane extending vertically above and extending through the central longitudinal axis of the cylindrical bottom counter roller 71. Bottom counter drive roller 71 has a rigid cylindrical shaft 52 which is rotatably located in left and right journal 53.1 and 53.2. The journals 53.1 and 53.2 are firmly supported on the left side frame member 23 and the right side frame member 24 of the main frame assembly 21 between the front and rear end thereof; journals 51.1 and 51.2 are nearer to rear transverse member 25. The top counter roller 72 is located in vertically extending upwardly open U-shaped slots 56 and 57 in brackets 54 and 55, respectively, that provide vertically movable location of the central longitudinal cylindrical axis of the shaft 77 vertically above the shaft 52.

The adhesive roller power roller 60 comprises a central rigid cylindrical shaft 60.1 and left and right driven lateral end rollers 62 and 63. The shaft 60.1 is a rigid straight steel shaft and is covered by a relatively uniformly thick woven central cover 61 between the lateral sides of side walls 42 and 43 of adhesive dispenser assembly 40; shaft 60.1 is rotatably supported near its ends in left and right journals 62.1 (not shown) and 63.1 in left and right frame side walls 23 and 24, respectively. An 11 tooth gear wheel 63.2 located on the right side of wall 24 is driven by a motor and chain supported on the main frame assembly 21 laterally of right side member 24. The gear wheel 63.2 is firmly attached to a portion of shaft 60.1 that extends rightwards of wall 24. The central longitudinal axis of shaft 60.1 is parallel to axes of shafts 68.1 and 65.1.

The adhesive rollers 64 and 67 have the same material as the tufted adhesive portions 65.2 and 68.2 therefor. Each of these tufted portions comprises a flexible rubber backing layer 68.3 about 0.1 inch thick with a fibrous layer as 68.4 one-fourth inch thick. The fibrous layer is composed of relatively coarse blades of small plastic waterproof ribbon, 0.5 mm wide, and 0.05 mm thick, arranged in rows one-eighth inch apart, with 10 blades per tuft, each tuft in a row one-eighth inch from its neighboring tuft. The backing layer 68.3 is formed of a flexible foam 1.5 mm thick with a peripheral dense non-porous plastic layer 0.5 mm thick to which the blades are attached. An anchor rod 43C is firmly attached to the anchor brace 43B and its ends set in slots as 28.1 and 29.1 in brackets 28 and 29.

The sheet material 110 dispensed, measured and coated and cut by operation of apparatus 20, is a standard 50 or 30 yard roll 111 36 inches wide (with range of 27 to 54 inches width) of vinyl or like plastic coated wallpaper 110: such sheeting is composed of an imperforate flexible hard vinyl plastic coating 112 of 0.010 inch thickness (about 0.3 mm) on a flexible rough softer woven backing 114 of 0.010 inch diameter fibers of cotton or artificial fiber with 0.020 inch lateral spacing between the fibers of such backing. The backing layer and surface layers are firmly adherent to each other. In operation, the sheet material roll is rotatably supported on the roller shaft 50. The vinyl layer or coating 112 is in contact with the outer layer 120 of roller 71 and outer layer 61 of roller 60 and the backing layer 114 is in contact with outer layers 78, 65.2 and 68.2 of rollers 72, 64 and 67, respectively.

The counter assembly 70 comprises, in operative combination, a bottom support roller 71, an upper support roller 72, a counter wheel subassembly 73 and a motor drive assembly 73.1. The counter wheel subassembly 73 comprises a counter wheel shell 74. The counterwheel shell 74 is composed of a rigid left side wall 74.1, rigid right side 74.2, front wall 74.3, rear wall 74.4, top wall 74.5 and open bottom 74.6 firmly joined together to form a rigid shell chamber 75 open at its bottom opening 74.6: shell 74 is pivotally supported by a hinge 80 on the right side frame wall 24 between the counter drive roller 71 and the feed roll 50. The counter wheel subassembly also comprise a rigid counter shaft 84 which extends between the left side wall 74.1 and the right side wall 74.2 of subassembly 74. Shaft 84 is rotatably supported on left and right journals 84.1 and 84.2, respectively, in walls 74.1 and 74.2. A rigid circular counter wheel 82 is firmly and coaxially located on the central or inner portion of the shaft 84. A multi-lobed counter cam 86 is firmly attached to and supported on the lateral side of such shaft 84 within shell chamber 75. A counter arm 88 is pivotally and resiliently held by a spring 89 against the cam 86 and the arm is operatively connected to a counter switch 90.

Figure 3:
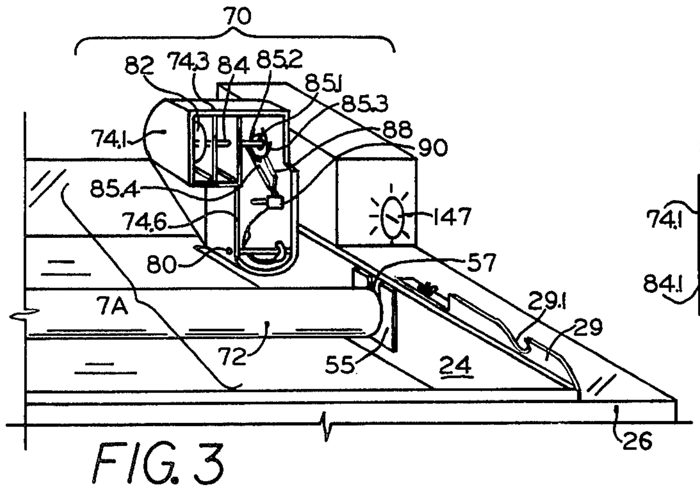
FIG. 3 is a front interior oblique view of zone 3A of FIG. 5 with the adhesive dispenser assembly 40 removed and showing counter wheel assembly 70 in raised position to permit insertion and replacement of pressure roller 72, and showing parts of the subassembly 70.

The counter wheel subassembly shell 74 is pivotally supported by hinge 80 on side wall 24 of assembly 21 and rotates about the hinge 80 about an axis located at height of bottom of slot 56 in bracket 54 and parallel to the axis of shafts of rollers 50 and 71. The shell 74 may be rotated counterclockwise, as shown in FIG. 3, to permit location of a fresh roll of material as 111 on shaft 50 and to extend a sheet therefrom over bottom support roller 71 and drive roller 60. In normal operation of apparatus 20, as shown diagrammatically in FIG. 6, the bottom edge of the counter wheel 82 rests on and is driven by the peripheral surface of the outer fibrous layer 78 of upper counter roller 72.

The counter cam 86 has a plurality of like teeth 85.1, 85.2, 85.3, 85.4 equal in size and equally spaced about its radial periphery or edge 87 of the cam 86. The counter arm 88 forward end in contact with the teeth as 85.1 of cam 86 moves upward and downward (up and down as shown in FIG. 6) and away from and towards the shaft 84 while the counter shaft 84 rotates. The normally closed contacts in the switch 90 open each time a tooth as 85.1 raises the arm 89 and the switch closes each time the front end of the arm 88 is lowered or moves towards shaft 84. The spacing of the teeth 85.1 to 85.4 on cam 86 is arranged to effect one closure of the electrical switch 90 and one digit on counter 83 for each inch of tangential movement of the edge of the counter wheel 82 (and surface 78 of roller 72). The switch 90 is electrically connected to a solenoid on frame 21 that actuates a visible numerical digital counter 83 located on frame member 26 to indicate the amount of linear travel of the edge of the wheel 82. The movement of wheel 82 directly and truly measures the amount of linear movement of the sheet material of 110 passing below roll 72. The bottom counter drive roll 71 comprises an inner rigid straight cylindrical shaft 52 rotatably supported in journals 53.1 and 53.2: it firmly attaches between the journals to a peripheral surface layer 120 and it is firmly attached to a laterally located drive wheel 79 at one end.

The drive roller 71 has a complete single compressible outer surface layer 120 wrapped around and attached to the shaft 52. The material of the layer 120 is known as velour or suede cloth. The layer 120 is, in turn, composed of three distinct layers — a bottom, an intermediate and an exterior layer, all firmly joined together as in FIG. 12. The bottom layer is a flexible woven backing layer 122 formed of flexible cotton fiber 123 arranged in a woven chain-stitch pattern formed of strands of about 0.4 mm diameter; layer 122 is about 0.8 mm thick. The intermediate layer 124 is formed of a flexible closed foam with holes 125 of 0.06 to 0.2 mm, average of 0.1 mm diameter and a total layer thickness of 0.5 mm. About one-half of the volume of layer 124 is air or voids. A dense outer plastic layer 127 of 0.2 mm thickness has about 0.5%, and clearly less than 10%, voids and is flexible. An outer fiber layer 128 of 0.8 mm average thickness is formed of fibers as 129 of 0.3 to 3.0 mm length, average of 1.0 mm and all about 0.025 mm diameter (±10%) of rough outer surface but similar thickness (±10%) with nodules of 0.02 to 0.05 mm diameter firmly attached to the outer surface. The vast majority of the fibers are more than 0.8 mm long and at angles of 45° to 60° to surface 127; about 10% are vertical and 10% at less than 45° to the surface of outer layer 127. All fibers as 129 are attached only at one end to the outer plastic layer 127, the other end of each fiber is free. These layers are illustrated in FIG. 12 to scale and to the scale shown by the distance indicated as 1.0 mm. The length of the fibers is such that some project far more than others and bear more of the force of the surface, 112, applied thereagainst.

Figure 4:
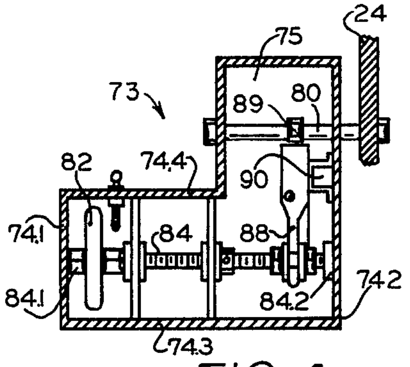
FIG. 4 is a cut-away plan view along section 4A—4A of FIG. 6 to show interior parts supported by the counter wheel frame.
Figure 5:
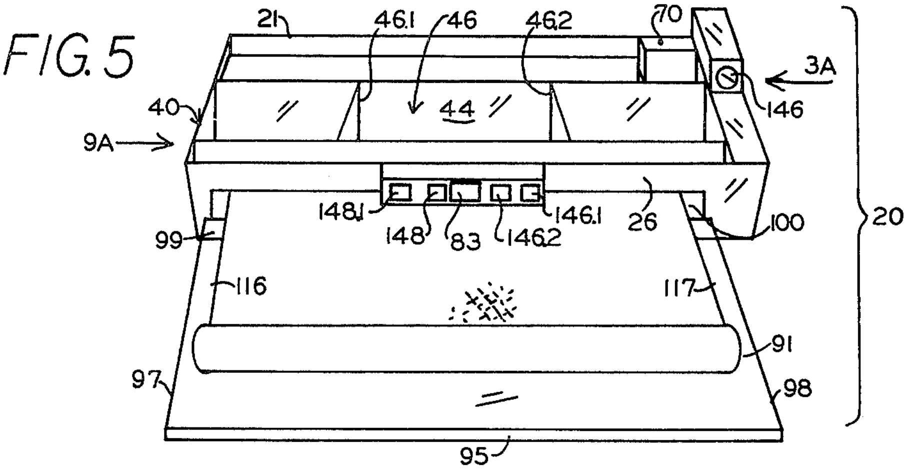
FIG. 5 is a front and top oblique view of the apparatus 20 in its operative position of parts.

The upper or pressure roller 72 is composed of a straight cylindrical rigid solid steel shaft 77 and a fibrous outer layer 78. The ends of the shaft 77 are rotatably and vertically movably supported in the slots 55 and 57 of brackets 54 and 56. In operation of the apparatus 20, as shown in FIGS. 4 and 5, the fibrous outer layer 78 rests on the backing layer 114 of the sheet material of roll 110. In the particular embodiment 20, the roller 72 weighs 15 pounds total.

An adjustable speed electric motor 145 is firmly attached to frame member 24 and supported thereby and is powered by conventional 110 volt source, 146, and has its speed controlled by setting of dial 147 and on-off switch 148. The output shaft of the motor 145 drives, by a single chain drive 149, both (a) an 11 tooth gear wheel 79 on the lateral end of shaft 52 of lower counter and drive roller 71 located on right side of wall 24, and (b) a 12 tooth gear 63.1 firmly attached to shaft 60.1 laterally of wall 24.

The peripheral or outer surface of the lower counter roller 71 is compressible and composed of peripherally located peripherally projecting felted mass of fibers as 129. Each of the projecting fibers has a harder surface than the outer surface 112 of the sheet material passed thereabove. One end of each of the fibers of the peripherally located fibrous mass is firmly attached to and supported on a resilient and deformable base of rubber or plastic. The peripherally located fibers do not project at right angles to the resilient base but extend outward at an angle thereto and are curved or bent rather than straight. The separate fibers are not parallel to each other but are arrayed generally as a felted mass with each fiber at an angle to its neighboring fiber as well as at an angle to the base therefor. The fibers are sufficiently spaced from each other that the separate fibers are not interlaced and supporting each other but rather each fiber bends at least in part relative to the surface of the base to which such fiber is attached relatively independently of like fibers located adjacent thereto.

The number of fibers as 129 projecting from surface 127 is very large — about 5 per linear 0.5 mm, for a total of about 62,500 per square inch of surface of layer 127. While the exterior surface of layer 120 is smooth to the touch, the fibers 129 of layer 128 are of different length: Therefore, with increased pressure, more contacts between the fibers as 129 and the vinyl surface as 112 are made. Accordingly, the combination of rods 71 and 72 provides that all parts of the sheet as 110 being dispensed and metered move past the flat vertical plane joining the central longitudinal axis of the lower counter roll 71 and the central longitudinal axis of the cylindrical upper counter roll 72 at the same speed at any moment, or, that each increment of length of the roll of sheet 110 measured from left edge 116 to right edge 117 of the sheet 110 is permitted the same displacement or movement over the same period of time transverse to axes of rolls 71 and 72. The density and diameter and hence the pressure of the upper counter roll 72 is sufficiently great that this holding effect is achieved; however, the weight and diameter of the upper and lower rolls are sufficiently small that the tension of the sheet 110 is not sufficiently resisted by the moment of inertia of the rolls 71 and 72 and the force therebetween that the sheet will be stretched beyond its elastic limit in the normal rate of pulling the sheet from the feed roll to the cutting edge 99. The weight of roll 72 is not sufficiently great to cause penetration and rupture of the sheet surface 112 by the free ends of the fibers of surface 120 of roller 71 applied thereagainst. The weight of the upper counter bar 72 holds the lower face 112 of the sheet 110 against the upper surface layer 120 of the lower counter bar 71. The upper surface layer of the lower bar 71 is distorted elastically and also grips the lower smooth surface 112 of the sheet 110 and thereby all parts of the sheet 110 are from one, left side thereof 116 to the right side 117 thereof, are firmly held and move together tangentially of the roller and in contact therewith without any one portion of the sheet moving faster past the roller 71 than other portions of such sheet. The movement on the surface 78 of the roller 72 in contact with the edge upper counter roller 82 measures the movement of the upper roller without slippage of the roller 72 relative to sheet 110 whereby the upper roller provides a measure of the movement of the sheet 110 therepast that is a true measure thereof because all portions of the sheet 110 are moving at the same linear speed, whereby all portions of the upper roller 72 move at the same peripheral linear speed, hence measurement by wheel 82 of one portion of the roller 72 surface peripheral speed is a true measure of the amount and speed of movement of all portions thereof.

The cutting board assembly 91 comprises a rigid flat cutting board 92, a left vertical support 93 for the board, a right support 94, each firmly attached to base assembly 30 and board 92. The board 92 has a straight discharge edge 95 as well as a straight left side edge 97, and a straight right side edge 98. A rigid straight cutter edge support 96 is firmly attached to front edges of side members 23 and 24 of assembly 21 and, as shown in FIG. 6, is located above the rear edge of the board 92 and extends from its left edge 97 to its right edge 98. The cutter board support 96 is a rigid L-shaped steel angle with a straight cutting edge 99 which is located and supported slightly above the face 92' of the board 92.

The adjustable gate 45 is rectangular in shape and its bottom edge is straight and located so that the height thereof is adjustable relative to the outer surface of the adhesive roller 64. Anchor brace 43B is firmly attached to wall 43, and anchor rod 43C projects laterally of the side walls 41 and 42 of the liquid dispenser assembly respectively. Slots 28.1 and 29.1 in brackets 28 and 29 engage the ends of anchor rod 43C.

Wing brackets 118 and 119 extend laterally from the left side 41 and right side 42 of the liquid dispenser assembly 40 and slots thereof engage wing nuts 118.1 and 119.1 and the bolts therefor attached to the left and right side walls 23 and 24 of the main frame assembly 21. These bolts engage in slots therefor and in brackets 118 and 119, respectively, to fix the position of the liquid dispenser assembly 40 relative to the main frame assembly 21 in cooperation with holding of anchor rod 43C by slots 28.1 and 29.1 yet permit the release and removal of dispenser assembly 40 from frame 21 for cleaning and transport.

To start operation of apparatus 20, the operator 140 first locates a fresh roll as 111 of vinyl wallpaper on support roll 50. Assembly 70 is raised from roll 72 and rotated to position of FIG. 3 and roll 72 is raised and removed. Assembly 40 is disengaged from its support on brackets 28 and 29. Then, a portion of roll 111 is unwound and laid on top of rollers 71 and 60 and one sheet of paper is passed over and another under sheet 110 and passed to table surface 92' through opening 100 between transverse frame member 26 and cutting edge support 96, then the roller 72 is located in slots 56 and 57 and the counter wheel assembly shell 74 is rotated to position shown in FIG. 4.

The apparatus 20 is mobile and may be moved easily or carried through conventional sized residential doorways for operation in domestic as well as larger sized rooms. Once the apparatus 20 is located in the room whose walls are to be covered, then the anchor rod 43C of assembly 40 is located in slots 28.1 and 29.1 therefor in brackets 28 and 29 and wing nuts 118.1 and 119.1 engage and hold brackets attached to side walls 41 and 42 of assembly 40. Power cord 146 is connected to a source of electric power. The end rollers 62 and 63 of power roller 60 then operatively contact the end rollers 66 and 66' of adhesive roller 64 and end rollers 69 and 69' of roller 67. A volume of standard vinyl fabric wall covering adhesive 58 (such as Coerver Industries, Wall Covering Division, Dallas, Tex. No. Cl-100) is added to the compartment 46 in assembly 40. Dividers as 46.1 and 46.2 firmly fitting the front and rear walls and roller 64 may be placed in chamber 46 to provide a narrower chamber when vinyl sheets of less width than the full width of chamber 46 are dispensed, coated and cut by apparatus 20.

The operator then turns on switch 148 (which turns on a pilot light 148.1 in series therewith) and sets control knob 146. A flasher light 146.1 on wall 26 indicates the rate of operation of the counter roller 71. A flasher on-off switch 146.2 connects flasher 146.1. The motor 145 drives counter power roller 71 and adhesive roll power roller 60.

When the sheet 110 from the roll 111 of vinyl wallpaper is passed between the counter rollers 71 and 72, the bottom roller 71 presents an outer thin coat 124 of resilient material and exterior thereto the coating of very fine resilient hard projecting fibers thereon; each fiber thereof extends separately at an angle to the resilient coat 124 in varying lengths (0.3 to 3.0 mm). Of the large number — about 50,000 per square inch — of very thin projections as 129 which are long and readily bendable, only the small fraction of tallest fibers locks against the vinyl surface but these are sufficient in number (and increase with increased pressure) to limit any one portion of the vinyl surface 114 from passing through the space between the rollers 71 and 72 at a greater speed than other portions of the vinyl surface.

In this operation of contacting the vinyl sheet 110 by the two rollers, the longer fibers (as 129 in FIG. 12) are bent downward by the weight applied thereagainst by the vertically movable heavy upper roll 72 through the vinyl sheet 110 and provide a very great intensity of force or pressure at the very small areas of contact of such fiber and vinyl surface as 129.1 in FIG. 12. These areas of contact are linear rather than pointed so that puncture of the vinyl surface is avoided. However, with this structure, the weight of the roller 72 transforms a smooth soft surface 120 to a rough hard surface that resists sliding motion of the vinyl surface therepast and causes engagement of the roller 71 and the vinyl surface 112. Some of this engagement between layers 112 and 128 is mechanical, with the long fibers of surface zone 128 extending into and locking into the larger microscopically observable irregularities in the usual vinyl wallpaper surface 112 without damaging that vinyl surface by visible scratching or puncture. Accordingly, the driving of shaft 52 by motor 145 at an even rate of speed smoothly unwinds sheet 110 from roll 111 for passage to rolls 60, 64 and 67 and opening 100 and table surface 92'.

As all portions of the cloth 110 are moved at the same rate of speed by rollers 71 and 72, the top counter roller 72 above the bottom roller 71 and resting on the backing 114 of the vinyl sheet 110 engages and is rotated by the friction between the backing layer 114 of the wallpaper 110, and the peripheral rough cylindrical surface 78 of the upper roller 72 at the same rate of peripheral speed as the vinyl sheet 110 moves.

The pivotally mounted counter wheel 82 is sensitive to and directly measures the linear motion of the upper roller 72 and provides an undistorted measure of the rate of movement of the vinyl cloth 110 past the lower roll 71 notwithstanding variations in thickness of the vinyl sheet 110 as due to embossing and texturing of such vinyl surfaces.

When the motor 145 is turned on, the end rolls 62 and 63 of the power roller 60 contact and drive the end rolls 66, 66', 69 and 69' of adhesive rollers 64 and 67. Adhesive roller 64 then transfers adhesive 58 from the tank or container compartment 46 to the upper backing surface 114 of the sheet material 110 being treated by this apparatus. The second adhesive roll 67 serves to carry off the excess adhesive that which was not adherent to the backing surface 114 of sheet 110 to the reservoir zone 141 so that excessive amounts of adhesive are not applied onto the backing of the wall covering and the resultant layer of adhesive 59 is thereby uniform.

The outer surface of roller 60 moves at a slightly greater linear speed than the linear speed of the periphery of roller 71 but this difference is only enough to keep the material 110 between rollers 71 and 60 slightly taut rather than limp and provides no permanent stretching of sheet 110.

The fibrous layer 78 on the exterior surface of roller 72 is identical to the backing layer 114 of the vinyl sheet 110, i.e., a woven flexible cloth, rough as seen under the 10× handlens, but soft to the touch of a finger. It engages the backing layer 114 of sheet 110 and moves therewith. The edge of wheel 82 is roughened very slightly to engage surface 78.

The operator 140 observes the discharge of the coated sheet 110, coated with the adhesive layer 59 and the indication of length of sheet treated at counter 83 while drawing the sheet from opening 100, as shown in FIG. 13, and may fold the coated sheet back on itself, as shown in FIG. 14, and then, when the proper length is delivered, stop the machine operation by switch 148 when the desired length of sheeting has been passed beyond the cutting edge 99. For this purpose, the counter 83 is set to measure the length of sheet 110 passed beyond the cutting edge 99, and returns to and registers zero when the snap switch 148 is turned to "off". When the motor is so turned off, the holding power of the counter rolls 71 and 72 on sheet 110, (when those rolls or rollers 71 and 72 are stationary) continues to serve to firmly hold the sheet 110 against displacement after glue as 58 is applied to the backing 114 and when the thus coated sheet is ready to be cut and while it is being cut.

The operator 140 then cuts the coated sheet 110 while the sheet 110 is held against the cutting edge 99 and the rollers 71 and 72 hold the sheet 110 against displacement due to the tensile forces developed by such cutting. A razor blade or sharp knife may be used for such cutting. After cutting of the thus coated portion of sheet 110 to appropriate length as indicated by the counter 83, the operator 140 may proceed to immediately hang the just-cut portion of adhesive-coated vinyl wallpaper on a wall as 142, while another operator 150 may proceed to start the machine 20 at switch 148 for an appropriate length of wallpaper. Where short headers as at 143 over a doorway as 144 are needed, lengths of wallpaper of the same sequence of production of such paper — from lengths immediately following those used for covering adjacent wall areas — may be used and thereby avoid any lack of matching of adjacent wall surfaces due to change in color of the wallpaper during production runs of manufacture of such wallpaper.

The result of the operation using apparatus 20 is that three men normally dispense, meter, coat, cut and apply 240 yards of wallpaper per day.

While this process and operation have been described for use in dispensing vinyl coated wallpaper, other textured surfaced material may be dispensed, metered, coated and cut thereby, such as cellophane and other material difficult to handle, as wire screening, tissue paper, carbon paper, and delicate knit cloth that might otherwise be selectively stretched.

In a particularly preferred embodiment, the walls 41 and 42 of the assembly 40 are provided with laterally projecting handles 41.4 and 42.4 firmly attached to those end walls.

Conventional vinyl wallpaper as 110 is composed of an outer decorative vinyl plastic as 112 that is embossed or textured to depths of 0.25 mm and colored usually in regularly repeated patterns, to provide a more pleasing appearance to the eye for maintenance, convenience and to simulate cloth and/or tapestry: such texturing can be seen by the naked eye or 5× hand lens. Such vinyl layer has an exterior surface that is harder than the paper surface of wallboard or usual surface of plaster walls and, hence, is more durable and also water repellent, hence is readily washed. The rear surface 114 of such vinyl wallpaper is made of conventional cloth to provide strength and dimensional stability to the plastic layer.

The qualities that make the vinyl wallpaper desirable also make it normally difficult to handle without damage thereto as is recognized by those of ordinary skill in the art, as set out in the description of the prior art hereabove.

However, with the apparatus and process of this invention, as above described, productivity, reliability and ease of operation are greatly increased.

The roller 72 is necessary to the operation of apparatus 20; without it, cooperation with the lower roller 71, the driving of roller 71 by motor 145 in contact with the lower layer 112 of sheet 110 will not serve to draw the vinyl coated sheet 110 from the roll 111.

Dimensions of the exemplary embodiment of apparatus 20 are set out in Table I (Insert A).

TABLE I

SOME DIMENSIONS OF EXEMPLARY EMBODIMENT 20:

| Assembly | Characteristic | Distance Between Members | Dimension |
|---|---|---|---|
| 21 | Length | 25–26 | 24" |
| | Axis Spacing | 71–60 | 6" |
| | Axis Spacing | 50–71 | 12" |
| 40 | Top Opening | 47 | 7" |
| | Height-Wall 43 | | 5½" |
| | Width | 41–42 | 55" |
| 110 | Width of Sheet | 116–117 | 48" |

TABLE I-continued

SOME DIMENSIONS OF EXEMPLARY EMBODIMENT 20:

| Assembly | Characteristic | Distance Between Members | Dimension |
|---|---|---|---|
| 92 | Length | 99–95 | 24" |
| Roller | Outside Diameter | 71 | 2½" |
| | | 72 | 2½" |
| | | 60 | 2½" |
| | | 64 | 2½" |
| | | 67 | 2½" |
| Motor 145 | Power | 1/45 HP | |

Rate of dispensing, measuring and coating 9 feet of coated sheet 110: 40 seconds to 3 minutes Material of Sheet 110:
Layer 112 - Polyvinyl Chloride
Layer 114 - Cotton Fabric

We claim:

1. In a process for measuring, coating, dispensing and cutting a textured sheet comprising an exterior textured surface layer with indentations therein on one side of said sheet and a rough backing layer on the opposite side of said sheet and firmly adherent to said first textured surface layer, the improvement comprising the steps of (a) rotatably supporting a generally cylindrical roll of said textured sheet along a first central longitudinal axis of said roll (b) unrolling portions of said sheet from said roll and sequentially passing each of such portions between a pair of generally cylindrical rollers each with a central longitudinal axis parallel to each other and to said first central longitudinal axis of said roll and spaced apart longitudinally from said first axis of said roll, said passing being accomplished by (i) driving one of said rollers to rotate about its axis while, on the surface of said one roller a plurality of fine resilient fibers of varied length and having a diameter smaller than the size of the indentations in said first surface of said textured sheet extend at an acute angle to the peripheral surface of said one roller and resiliently engage said exterior textured surface layer of said portion of said sheet and (ii) a second roller with a rough cylindrical surface layer yieldably presses on and directly engages the rough backing layer of said one portion of the textured sheet and yieldably forces the other textured surface layer of said one portion of the textured sheet against the elastic fibers on the surface of the first roller and resiliently deforms said fibers and said deformed fibers then engage and grip the textured surface layer without scratching or puncture thereof and said deformed fibers on said one roller then move all portions of said textured sheet across the width thereof at a uniform rate along its length and said second roller is then rotated by the rough backing layer of said textured sheet without slippage and (c) repeatedly sensing and measuring the rotary movement of said second roller and indicating a linear measurement thereof and (d) contacting a second portion of said exterior textured surface layer of said textured sheet by a third roller and driving said third roller while a fourth roller free of direct contact with said third drive roller contacts said backing layer of said second portion of said textured sheet and is rotated by engagement therewith and transfers adhesive on to the exterior backing layer of said second portion of said textured sheet and coats said exterior backing layer of said sheet therewith and (e) stopping the movement of said sheet by said rollers after a predetermined indication of amount of movement of said sheet along its length and, while continuing to hold said sheet between said rollers, cutting the coated sheet.

2. Process as in claim 1 wherein said textured sheet is a sheet of vinyl plastic coated wallpaper.

3. Process as in claim 2 wherein said fibers are about 0.025 mm in diameter and vary in length between 0.3 mm and 3.0 mm.

4. Process as in claim 3 wherein said steps of unwinding, passing, moving, measuring, indicating, stopping and cutting are consecutive.

5. In a process for measuring, coating, dispensing and cutting a textured sheet comprising a hard lower exterior textured surface layer with indentations therein on one side of said sheet and an upper rough backing layer on the opposite side of said sheet and firmly adherent to said first lower textured surface layer, the improvement comprising the steps of (a) rotatably supporting a generally cylindrical roll of said textured sheet along a first horizontally extending central longitudinal axis of said roll (b) unrolling portions of said sheet from said roll and sequentially passing each of such portions between a pair of generally cylindrical rollers each with a central longitudinal axis each said central longitudinal axis of said pair of rollers parallel to each other and to said first central longitudinal axis of said roll and spaced apart longitudinally from said first axis of said roll, one of said rollers located above said sheet, the other of said pair of rollers located below said sheet said passing being accomplished by (i) driving the lower one of said rollers to rotate about its central longitudinal axis while, on the surface of said one lower roller a plurality of fine resilient fibers of varied length and having a diameter smaller than the size of the indentations in said first lower surface of said textured sheet extend at an acute angle to the peripheral surface of said one roller and resiliently engage said exterior textured surface layer of said portion of said sheet and (ii) a second roller with a rough cylindrical surface layer yieldably presses on and directly engages the upper rough backing layer of said one portion of the textured sheet and yieldably forces the lower textured surface layer of said one portion of the textured sheet against the elastic fibers on the surface of the first roller and resiliently deforms said fibers and said deformed fibers then engage and grip the textured surface layer without scratching or puncture thereof and said deformed fibers on said one roller then move all portions of said textured sheet across the width thereof at a uniform rate along its length and said second roller is then rotated by the rough backing layer of said textured sheet without slippage and (c) continuously sensing and measuring the rotary movement of said second roller and indicating a linear measurement thereof and (d) passing a second portion of said lower textured surface layer of said textured sheet over a third roller and driving said third roller while a fourth roller free of direct contact with said third roller contacts said backing layer of said second portion of said textured sheet and is rotated thereby and transfers adhesive on to said upper backing layer of said second portion of said textured sheet and coats said exterior backing layer of said sheet therewith and (e) stopping the movement of said sheet by said rollers after a predetermined indication of amount of movement of said sheet along its length and, while continuing to hold said sheet between said rollers, cutting the coated sheet transversely to its length.

6. Process as in claim 5 wherein said textured sheet is a sheet of vinyl plastic coated wallpaper.

7. Process as in claim 6 wherein said fibers are about 0.025 mm in diameter and vary in length between 0.3 mm and 3.0 mm.

8. Process as in claim 7 wherein said steps of unwinding, passing, moving, measuring, indicating, stopping and cutting are consecutive.

* * * * *